United States Patent [19] [11] Patent Number: 4,782,348
Siegner [45] Date of Patent: Nov. 1, 1988

[54] DEVICE FOR HIGH RESOLUTION RECORDING OF LIQUID CRYSTAL DISPLAY IMAGES

[76] Inventor: George L. Siegner, 3100 W. Riverview Dr., Post Falls, Id. 83854

[21] Appl. No.: 126,565

[22] Filed: Nov. 30, 1987

Related U.S. Application Data

[63] Continuation-in-part of Ser. No. 887,543, Jul. 18, 1986.

[51] Int. Cl.$^4$ .......................... G01D 9/42; G02F 1/13
[52] U.S. Cl. .................. 346/107 R; 350/334; 350/345; 350/352
[58] Field of Search .................. 346/107 R; 350/334, 350/345, 352

[56] References Cited

U.S. PATENT DOCUMENTS 4,378,956 4/1983 Lester .............................. 346/107 R
4,486,760 12/1984 Funada et al. ................... 346/107 R

FOREIGN PATENT DOCUMENTS 2710735 9/1978 Fed. Rep. of Germany .

Primary Examiner—E. A. Goldberg
Assistant Examiner—Mark Reinhart
Attorney, Agent, or Firm—Wells, St. John & Roberts

[57] ABSTRACT

A photosensitive recording medium is arranged in contact with the outside surface of a curved liquid crystal display cell forming a partial or complete cylinder. Both the liquid crystal display cell and the photosensitive member are arranged concentric to the axis of a linear radiation source. The linear radiation source is segmented by a number of nonreflective fins along its length. By controlling the radius of the cylinder or cylindrical section, the thickness of the liquid crystal display cell, the diameter of the linear radiation source and the spacing and depth of the segmentation fins surrounding the radiation source, a projection of the image displayed on the liquid crystal display cell may be obtained and recorded on the surface of the photosensitive medium with sufficient resolution to enable high resolution recording of the displayed information.

13 Claims, 6 Drawing Sheets

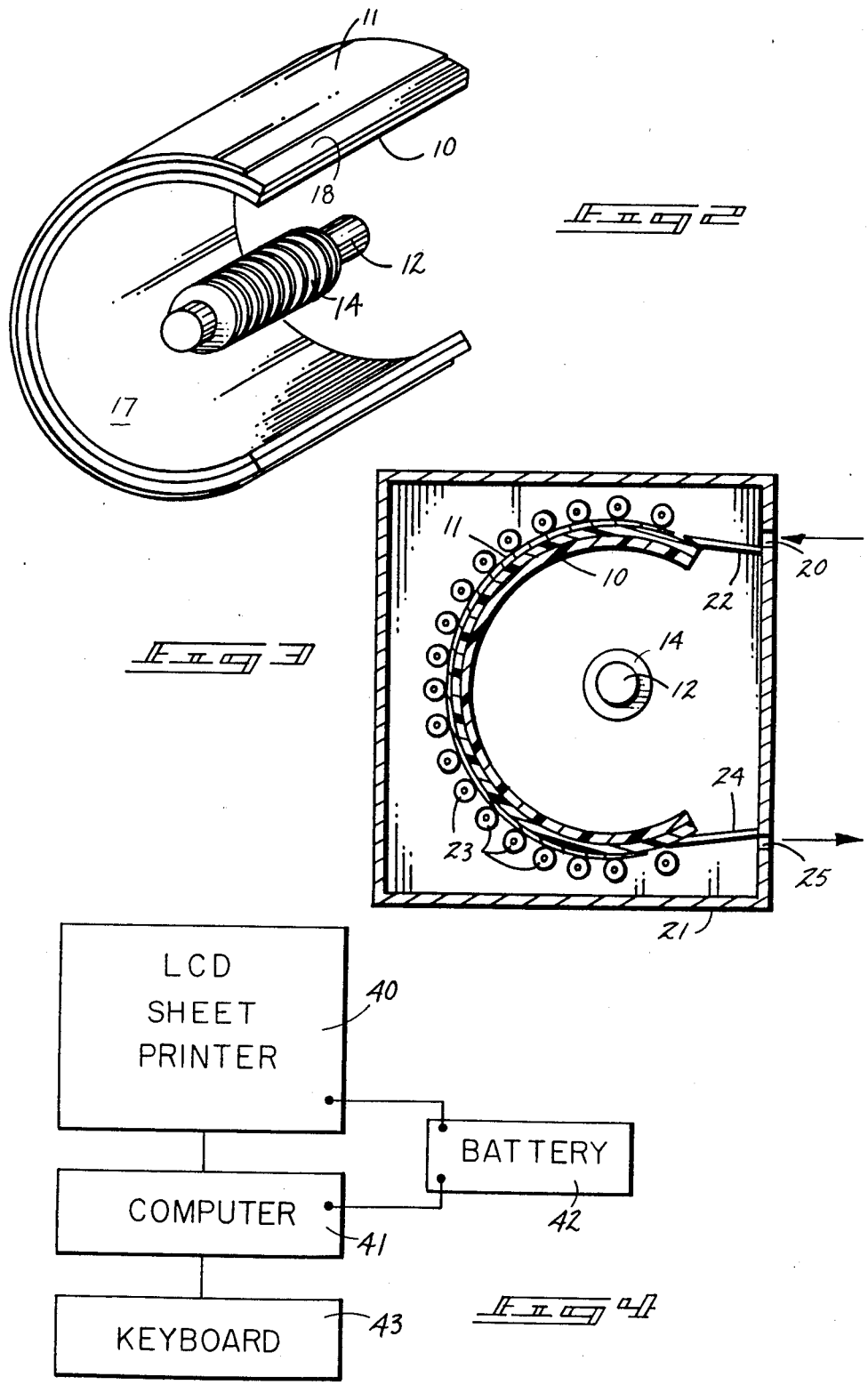

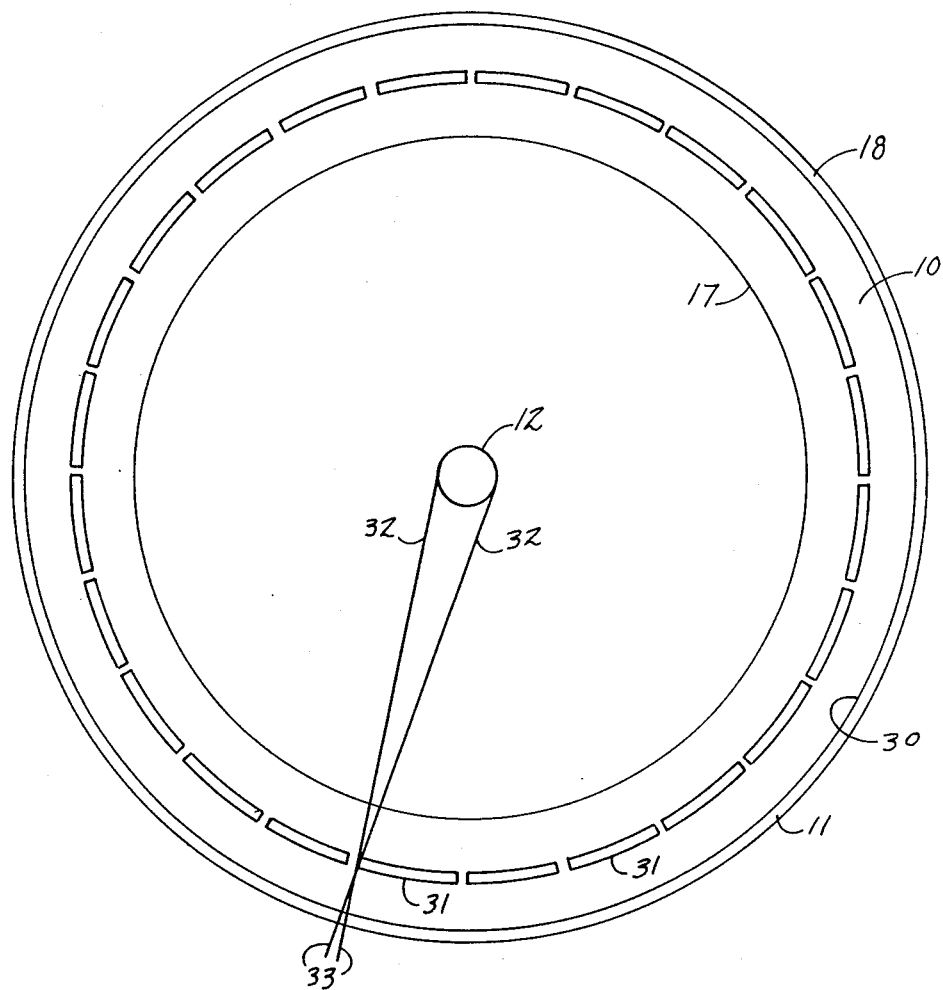

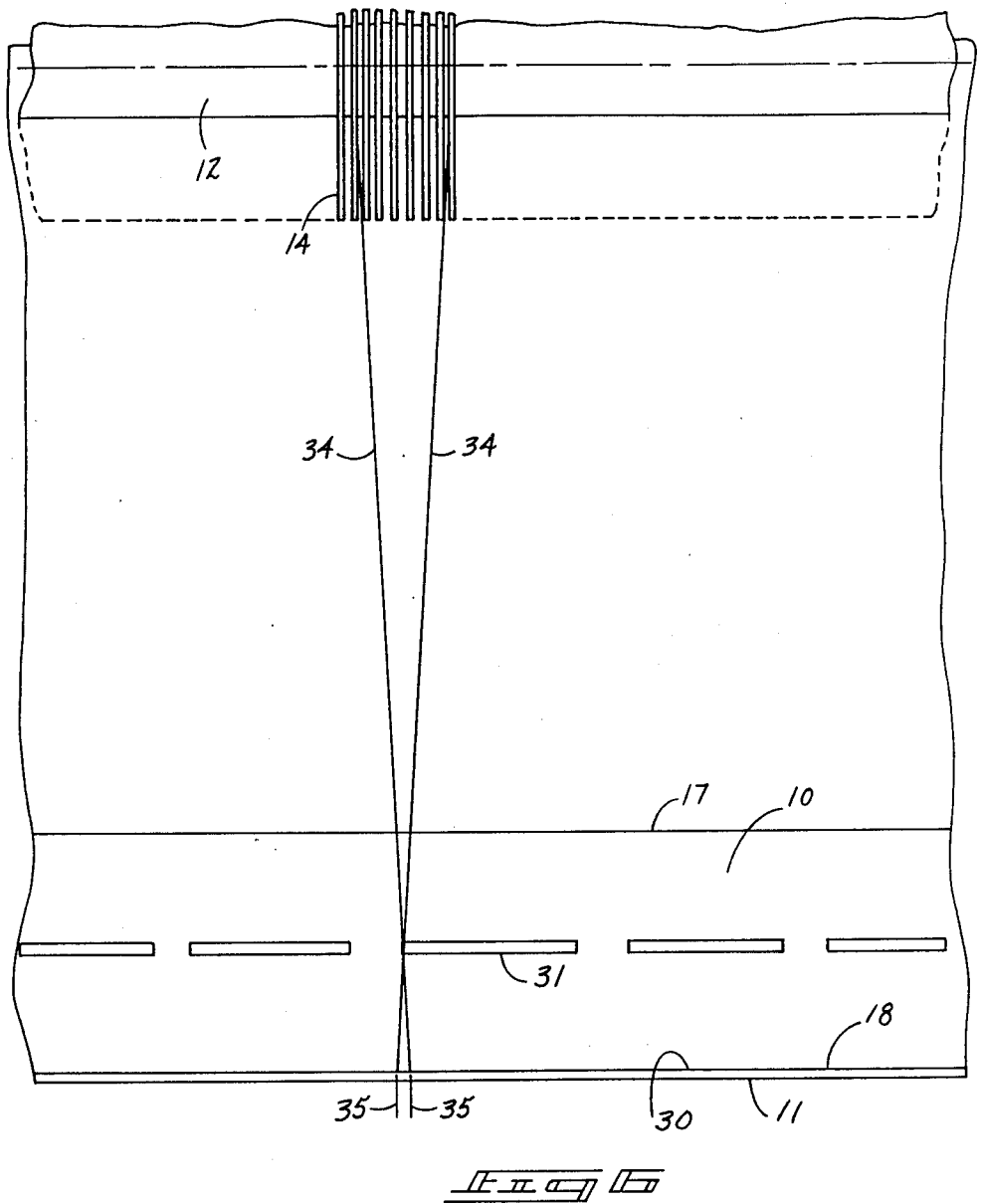

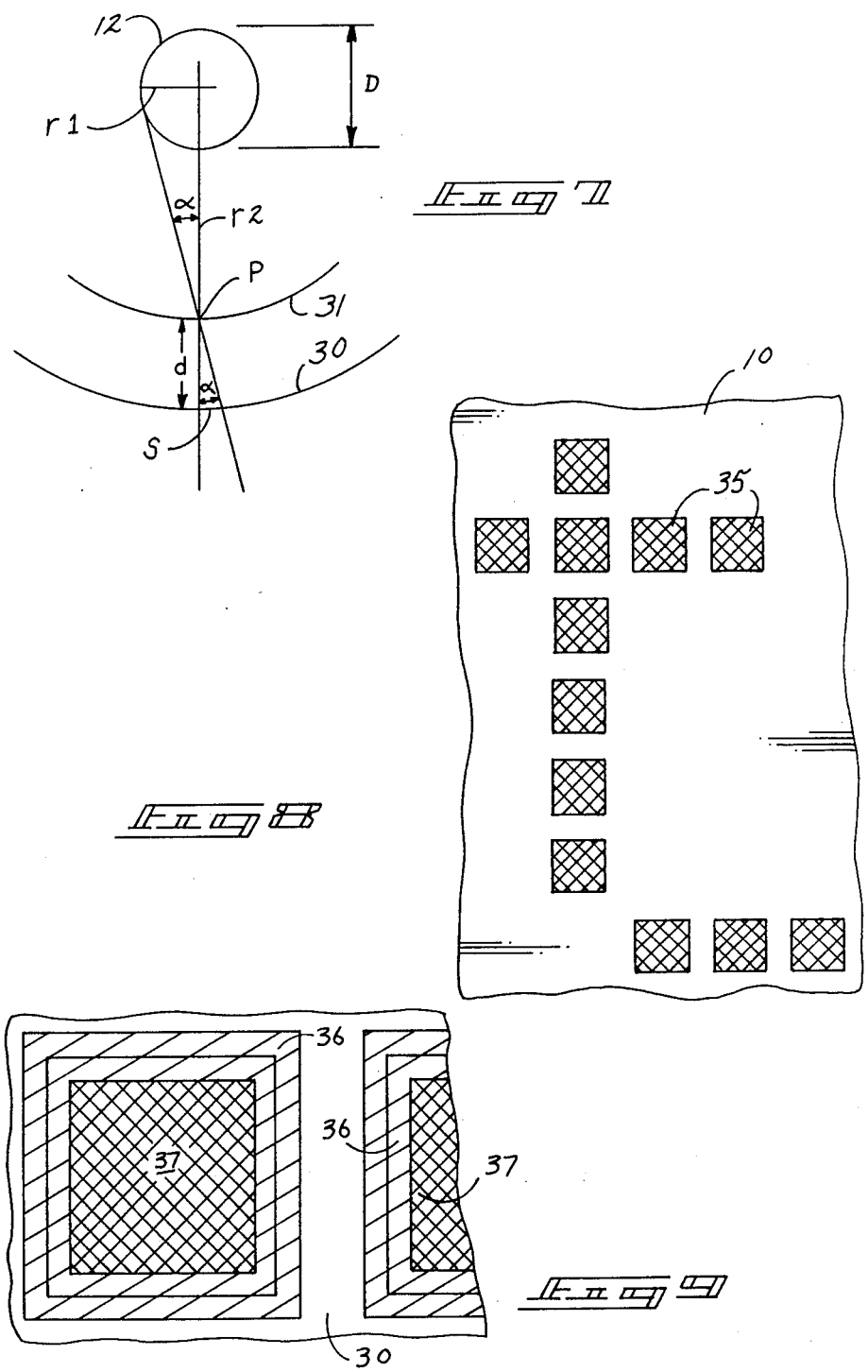

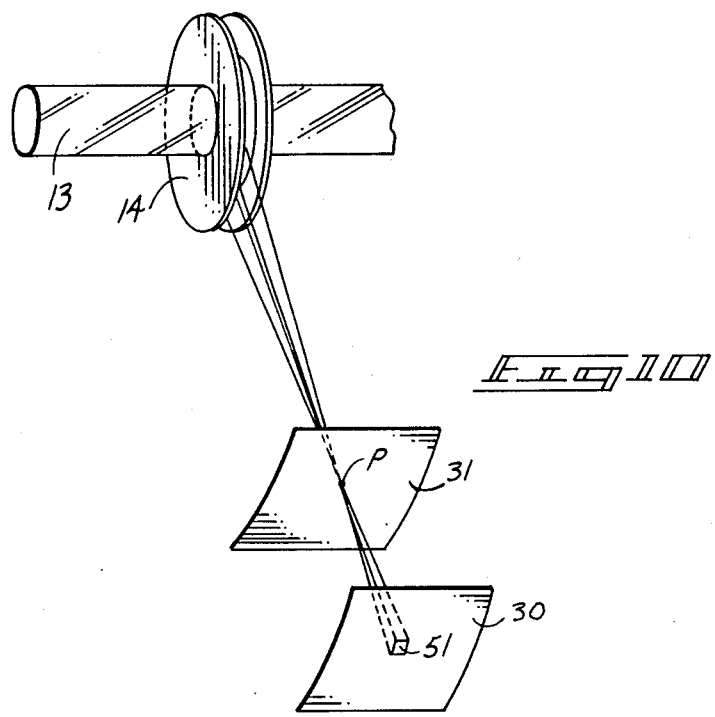
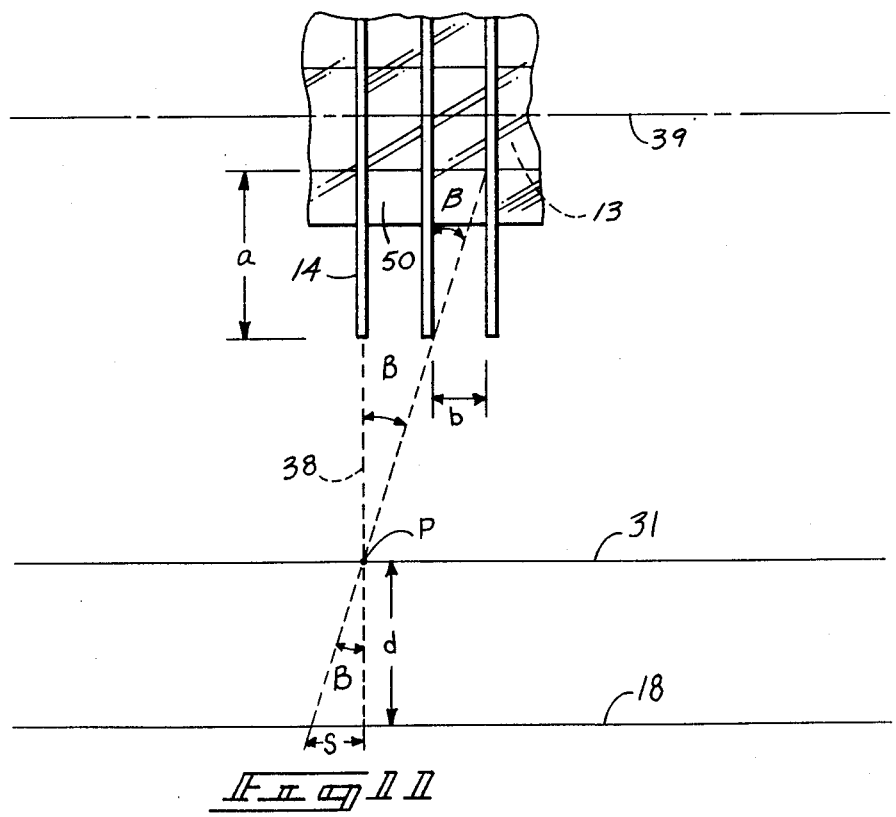

DEVICE FOR HIGH RESOLUTION RECORDING OF LIQUID CRYSTAL DISPLAY IMAGES

RELATED APPLICATION

This is a Continuation-in-Part of copending U.S. application Ser. No. 887,543, filed July 18, 1986.

FIELD OF THE INVENTION

This disclosure relates to portable and stationary printers for computers and other electronic devices that generate electronic data that is converted to printed characters or graphics. Composition of characters or graphics for printing on a sheet is achieved by an electronically controlled liquid crystal display.

BACKGROUND OF THE INVENTION

This invention arose from a recognition of the need to produce a lightweight portable printer having the capability of high speed printing of relatively large volumes of characters of graphic information on a sheet with minimal battery requirements.

Portable computers, data collection devices, and other electronic devices often require the use of a printer to produce a "hard copy" of the useful information generated by the devices. This is typically achieved today by the use of various electromechanical printers, which require substantial battery sources or frequent recharging in order to meet the electrical power requirements of the movable print heads, motors, heaters and paper drive assemblies included in such printers. The preferred embodiment of the present device is designed to minimize the mechanical complexity of any printer, to minimize the electrical power requirements of the printer, and to produce a durable printer having unlimited flexibility with respect to the nature of the characters and graphic information that it can produce.

U.S. Pat. No. 4,486,760 to Funada et al. discloses a recording system utilizing a liquid crystal display cell. The basic structure disclosed in the patent pertains to interposing a twisted nematic liquid crystal cell between a light source and a photosensitive recording member. The image generated by the display cell is thereby recorded on the photosensitive recording member. However, in order to overcome the viewing angle dependency of such a display cell, and the light dispersion that takes place within such a cell, the patent teaches the use of a fiber plate including a plurality of optical fibers having axes perpendicular to the plane of the liquid crystal layer as a replacement for one of the conventional glass substrates in such cells. The fiber plate is stated to substantially reduce the distance between the photosensitive recording member and the image light source to produce a clean and high contrast recording.

To expand upon this concept, two limiting considerations are addressed. The first of these factors is the viewing angle dependency of a highly multiplexed liquid crystal display cell, and the effect of this viewing angle dependency on the contrast ratio of the element to be recorded when exposed in a direction perpendicular to the plane of the image. For purposes of this disclosure, contrast is considered to be a non-issue, as technological advances are constantly increasing the effective contrast of liquid crystal displays, and contrast, by definition, can be controlled to a large extent through exposure times, exposure intensity and the chemistry of the recording medium.

The second and more significant factor is resolution. The principal factor influencing resolution in liquid crystal display recording scheme is parallax, and the resulting ambiguity as to the exact location of the edge of an image when projected upon the recording surface, a finite distance away, by light rays coming in at various angles. One method of overcoming the parallax problem is to render the light rays perpendicular to the image to be superimposed upon the recording medium after passage through the liquid crystal display cell. Such a method is described by Funada et al. in U.S. Pat. No. 4,486,760, in which a unique liquid crystal display cell is constructed, substituting a "fiber plate" for one of the glass plates in a conventional liquid crystal display cell.

While the use of a fiber plate as described in U.S. Pat. No. 4,486,760 might be practical in very small scale applications, the cost involved in producing such an assembly for normal full page reproduction of data is prohibitive. Furthermore, with respect to portable printing, the bulk, weight and fragility of such a cell would render it impractical except for stationary applications.

Control of the radiation directed to a liquid crystal display cell in a planar projection scheme is a difficult proposition due to the need to produce uniform amounts of radiation over the entire surface of the liquid crystal display and the recording plane, while simultaneously ensuring substantially parallel incidence of the radiation upon the two planar surfaces. A much more direct approach offered by the present disclosure is to form the image or projection plane in the shape of a cylinder, relying on the radial property of the cylinder to limit dispersion angles in one dimension, and to control dispersion angles at the source through a simple baffle arrangement in the orthogonal direction.

The present solution is to overcome parallax by controlling the direction of the radiation between the source and the liquid crystal display cell, ensuring that the rays that leave the source impinge upon the display plane of the liquid crystal display, and subsequently upon the surface of the recording medium, in essentially parallel fashion.

It is therefore an object of the present disclosure to produce acceptable levels of resolution at the surface of the photosensitive recording medium without resorting to exotic and expensive modifications of current liquid crystal display cell materials.

BRIEF DESCRIPTION OF THE DRAWINGS

The preferred embodiments of the invention are illustrated in the accompanying drawings, in which:

FIG. 2 is a schematic perspective view;

FIG. 3 is a schematic cross-sectional elevation view of a second embodiment;

FIG. 4 is a basic block diagram of a portable printer and associated computer hardware;

FIG. 5 is a diagrammatic view illustrating radial dispersion of radiation;

FIG. 6 is a diagrammatic view showing axial dispersion of radiation;

FIG. 7 is an enlarged diagrammatic view illustrating radial dispersion of radiation;

FIG. 8 shows a typical letter construction utilizing liquid crystal display cell technology;

FIG. 9 is an enlarged view illustrating acceptable levels of light dispersion that can be achieved by use of the dots shown in FIG. 8;

FIG. 10 is a schematic view showing the composite effect of restricting the angle of direct radiation in both the radial and axial directions; and FIG. 11 is an enlarged diagrammatic view illustrating axial dispersion of the radiation.

DETAILED DESCRIPTION OF THE PREFERRED EMBODIMENTS

Figure 1:
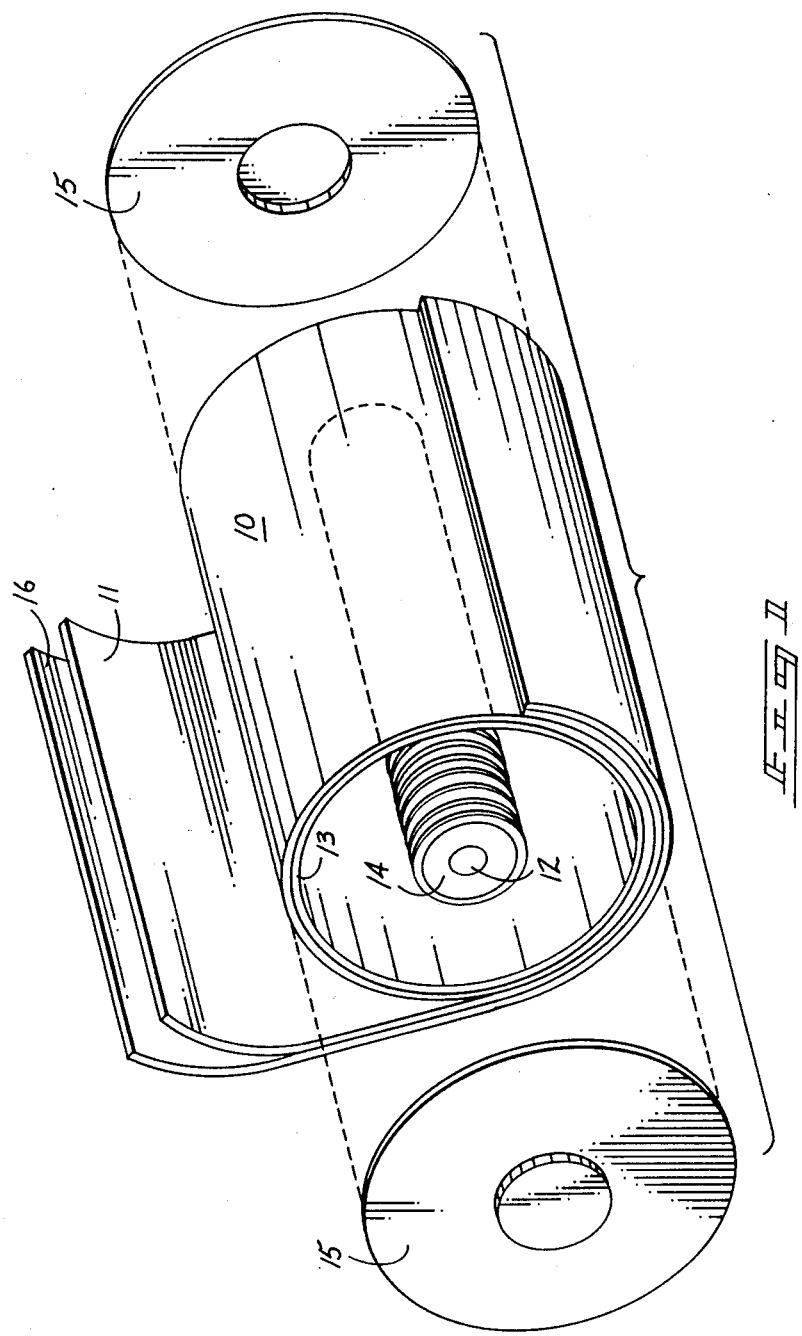
FIG. 1 is an exploded schematic view of one embodiment of the invention.

In compliance with the constitutional purpose of the Patent Laws "to promote the progress of science and useful arts" (Article 1, Section 8), applicant submits the following disclosure of the invention.

While the concepts expressed in the disclosure apply to both portable and stationary printers, they are particularly useful when incorporated in portable applications, where weight, power requirements and simplicity are vital. As portable and hand-held computers and other electronic data gathering and manipulating devices have become smaller, more sophisticated, and more powerful in terms of the data and functions that can be handled by them, there has arisen a need for portable, low power printers having the capability of high speed production of full sheets of printed information under battery power. Common electromechanical and thermographic printing devices have energy requirements that are excessive for full page printing applications in a true portable application, where electrical energy sources are very limited in both size and capacity.

The present arrangement has been designed to utilize existing technological elements in a new combination within a printer capable of simultaneously composing and producing a full sheet of printed information without mechanical movement of any printing element or the application of heat. It utilizes a liquid crystal display cell as a "dynamic negative" on which the desired print characters or graphic information are produced electronically. Information is transferred to a photosensitive sheet surface by exposure to light. The sheet surface is subsequently developed and/or fixed, if necessary, to produce a visually readable, permanent record of the displayed information.

The present invention relates to a recording system comprised of a conventional liquid crystal display cell formed in the shape of a cylinder or partial cylinder about a central axis. The axis also defines the axis of a coaxial radiation source much smaller in diameter than the diameter of the cylindrical liquid crystal display cell. A radiation sensitive medium is arranged in cylindrical fashion in contact with the outside surface of the cylindrical liquid crystal display cell, which is operated in the transmissive mode.

A means of segmenting the radiation emitted from the coaxial radiation source along the axis of the source is provided. In the preferred embodiment described in detail below, this segmentation is accomplished by means of a number of segmenting fins which consist of equally spaced disks distributed along the axis of a cylindrical light source; the plane of each disk being perpendicular to the central axis. This invention is not limited to visible radiation sources, nor is it anticipated that the only practical segmentation method is accomplished by means of the disks described above. One equally viable segmentation method would be to accomplish segmentation along the axis of the light source by placing a set of rings of specific depth and spacing in contact with the inside surface of the cylindrical liquid crystal display cell, such that the radiation arriving at the surface of the liquid crystal display is effectively columnated. Other variations will be obvious in the implementation of the concept presented here.

The present disclosure pertains to "printing" an image generated by means of a conventional transmissive liquid crystal display cell without relying on exotic methods of liquid crystal display cell construction. Further, this system can achieve high resolution reproduction of the liquid crystal display image by controlling the angle of incidence of the exposing radiation in one dimension only; the orthogonal dimension being eliminated as a factor through the cylindrical nature of the design and adherence to a set of basic design rules.

The general structure of this invention is schematically illustrated in FIG. 2, which is a simplified drawing illustrating only the key functional elements of a preferred first embodiment. These elements include a light-transmissive liquid crystal display 10, a sheet of photosensitive material 11, and a tubular lamp or other radiation source 12 surrounded by axially spaced columnating disks 14.

The operation of this apparatus involves the production of a full-scale, visually contrasting array of the electronically generated characters and/or graphic information desired on a printed sheet on a selectively transmissive liquid crystal display cell. This involves first placing a photosensitive surface of a removable sheet of material 11 in a stationary position overlying and engaging one side of the liquid crystal display cell. Next, the engaged photosensitive surface is exposed to radiation from the tubular lamp 12 transmitted through the liquid crystal display cell 10 while the contrasting array is maintained in a static condition. The information presented on the liquid crystal display 10 is thereby transferred to the removable sheet of material 11, which can be treated or developed as necessary in order to produce a permanent or semi-permanent "hard copy" of the generated information.

Note that the exposure of the recording medium could be accomplished as well by leaving the illuminating source on for a relatively long period of time, and selectively modulating the light transmission through dynamic control of all or a portion of the liquid crystal display, thereby accomplishing the desired exposure period. The dynamics of the exposure method are not central to the invention.

FIG. 1 is a simplified exploded view of the structural elements included in the present printing apparatus. It discloses a full cylindrical liquid crystal display cell 10 physically wrapped and supported about a tube 13 which is transparent to the radiation emitted by a tubular radiation source 12. The radiation source 12 carries a plurality of axially spaced columnating disks 14. Structural end caps 15 locate and support the radiation source 12, tube 13 and the liquid crystal display cell 10. When used for printing purposes, a sheet of photosensitive material 11 is wrapped in surface-to-surface contact about the outer surface of the liquid crystal display cell 10. It can be held in place by a flexible wrapper or cover 16.

The overall nature of a portable printer constructed according to this disclosure is schematically shown in the block diagram of FIG. 4. The printer, generally designated by numeral 40, is controlled by a computer 41 or any appropriate electronic data gathering, manipulating or producing device. Computer 41 is manually controlled through a conventional keyboard 43. Operation of keyboard 43 can be also used to control operation of printer 40 through the interposed computer 41. A battery 42 or other portable electrical power source is provided to supply the energy requirements of computer 41 and printer 40.

The liquid crystal display cell 10 of FIG. 1 can comprise any liquid crystal display that is selectively transmissive to the required radiation needed to activate the surface of sheet 11. It must be capable of producing a visually contrasting static presentation of information corresponding to that desired on a printed sheet. More specifically, the liquid crystal display cell 10 as shown in FIG. 2 includes inner and outer surfaces 17 and 18 which are equal or larger in size to the size of a desired printed area on the photosensitive sheet 11. The size relationship between liquid crystal display 10 and sheet 11 is such that no relative movement is required between the source of printed information (liquid crystal display cell 10) and the element on which this information is to be printed (sheet 11). The entire area of sheet 11 may be exposed and printed simultaneously. In actual practice, it is practical to print a conventional $8\frac{1}{2} \times 11$ sheet with a conventional number of columns, such as eighty, across its width. There is no need for transporting of the sheet 11 during the printing process, nor is there any need for movement of liquid crystal display 10 or for progressive modification of the information displayed by it. The printer comprises a stationary printing device which readily lends itself to manual feeding of the printed sheets, relatively slow radiation exposure, at low levels, and mechanical simplicity—all of which substantially reduce its energy requirements in comparison to known printing devices now available for producing visual records of automated data.

This invention preferably utilizes a matrix liquid crystal display cell having a large number of small point modules or pixels independently controlled by a microprocessor. Each point module or pixel can be "switched" from a light-blocking condition to a transparent condition, thereby permitting the presentation of alphanumeric and/or graphic information about the area of the liquid crystal display in any desired format. Where the desired display is comprised only of numbers arranged in predetermined rows and/or columns, a liquid crystal display cell having seven segment modules for numerical presentations can be used. The manner by which information is presented by the liquid crystal display cell is not critical to this disclosure. What is required is that it have an operational area capable of simultaneously presenting the information desired on each full printed sheet so that the entire photosensitive area of a sheet can be exposed to radiation through the liquid crystal display in a single step.

While conventional liquid crystal display technology today typically utilizes a sandwich structure or laminate made from glass sheets, there are also presently available liquid crystal display matrix arrays produced from plastic sheets. The reduced thickness of the plastic materials and their ability to easily be formed into a cylindrical configuration make them the component of choice for the present printing system. One specific product suitable for this application is the Polaroid (TM) Plastic Liquid Crystal Display (PLCD) produced and sold by Polaroid Corporation through its polarizer division, Norwood, Massachusetts. A Polaroid Plastic Liquid Crystal Display product has a total thickness of 0.015 inches. Its flexibility permits it to be readily shaped to a cylindrical configuration.

The photosensitive sheet 11 can comprise any sheet of paper or other material that is coated on one or both sides to include a surface which is responsive to the type of radiation emitted by operation of source 12. It must be capable of producing a visually contrasting pattern on the radiation-responsive surface after exposure. As one example, the sheet might comprise conventional Polaroid (TM) black and white film, which is produced in individual sheets carrying developing chemicals that are released as the sheets are fed through squeezing rollers. The sheet might alternatively comprise a sensitive coating that requires chemical development either internally, while within the printer, or externally, after removal from the printer. While the term "photosensitive" has been used throughout this description, the source radiation and emulsion sensitivity of the recording medium need not fall within the spectrum visible to the human eye, so long as the source radiation may be selectively blocked by the LCD, resulting in a humanly readable image on the recording surface. The technology used for the media on sheet 11 is not critical to an understanding of the present invention, since the information transferred from the liquid crystal display cell 10 onto the sheet 11 might be developed and/or fixed in any technically acceptable fashion. Such processes are well known.

The photosensitive sheet 11 is positioned in a stationary location to one side of the liquid crystal display cell 10. The printer schematically shown in FIGS. 1 and 2 is completed by a radiation source 12 positioned to the remaining side of the liquid crystal display cell 10 for selectively exposing the sheet 11 to a source of light through the liquid crystal display cell 10. In this way, a visual presentation of information produced on the liquid crystal display cell 10 is transferred to the photosensitive surface of the sheet 11. In FIGS. 1 and 2, this element of the printer is shown as a gas discharge flash tube 12. Because it is coaxial with the surfaces 17 and 18, it is capable of evenly directing light about the entire operative surface of liquid crystal display cell 10.

One key feature of this printer is its adaptability to portable printing applications. Because the printer requires no moving parts for producing and transferring the information desired on sheet 11, its only power requirements relate to operation of the liquid crystal display cell 10 and its control electronics, and the flash tube 12 or other means for exposing the sheet 11 to a source of light through the liquid crystal display cell 10. The flash tube 12 can be powered through a portable battery in a manner similar to the portable power sources used to supply electrical energy to such tubes for photographic lighting purposes. A portable printer according to this disclosure might be supplied with electrical energy from any portable electrical power source, shown schematically in FIG. 4 as a battery 42. It is to be understood that the portable electric power source might alternatively comprise other portable electrical energy devices, such as solar cells or small portable electrical generators. However, in most applications of a truly individual portable nature, the printer will be supplied with electrical energy by a storage battery, which can be either rechargeable or not rechargeable, as desired in a specific product application.

The printer broadly shown in FIG. 1 is capable of producing a printed sheet of any size and complexity, with all portions of the sheet being printed simultaneously through actuation of the flash tube 12 or its equivalent. The printer totally eliminates the need for any moving print head, as well as the need for any sheet movement during the printing process.

The printing steps described herein can be totally automated, but will normally be manually initiated by an operator after inserting sheet 11 behind liquid crystal display cell 10. All other processes involved in operation of the printer can be accomplished under direct control of a microprocessor, which can be either a dedicated processor in the printer 40 or the processor within its associated computer 41 or other electronic data generating device that directs information to the liquid crystal display.

During operation of the printer, the light valve matrix presented by the large area of the liquid crystal display 10 extending in two dimensions across the sheet 11 serves as a dynamic negative whose composition can be electronically generated by the controlling computer 41. The keyboard 43 associated with computer 41 can also be used to directly control generation of characters or graphics on the liquid crystal display 10.

The photosensitive sheet 11 is preferably positioned in an overlying position across the operational area of the light-transmissive liquid crystal display with the radiation-sensitive surface of sheet 11 in direct contact with one surface of the liquid crystal display cell 10.

In the preferred embodiment, the radiation source is a cylindrical glass tube (flash tube), filled with gas which emits light in the visible spectrum when pulsed with a high voltage. The recording medium is photosensitive paper, sensitive to light in the spectrum emitted by the flash tube. The liquid crystal display cell is a thin plastic liquid crystal display cell, such as the type manufactured by Polaroid under the name Polaroid PLCD.

The present invention is not limited to the specific components described above, however, and could be implemented using an ultraviolet sensitive mylar recording medium, a glass liquid crystal display cell manufactured in a cylindrical shape and a flash tube emitting light in the ultraviolet spectrum. The significant aspect of the invention is the cylindrical arrangement of the projection scheme, along with the other elements as discussed below.

As shown in FIG. 3, the photosensitive sheet 11 can be fed onto the outer surface of liquid crystal display cell 10 through a slotted entrance 20 across a surrounding printer enclosure 21. A sheet guide 22 leads the sheet between the liquid crystal display cell 10 and a series of parallel rollers 23 that hold the sheet 11 against liquid crystal display cell 10. The sheet 11 can be removed from enclosure 21 by means of a similar guide 24 leading to an exit slot 25 formed across one wall of the enclosure 21. This form of the printer would require additional energy for automatic operation of powered rollers 23, although the rollers 23 could be rotated or cranked manually to reduce the energy requirements of the device.

FIG. 5 schematically illustrates dispersion of light or other radiation from the source 12 to the receiving surface 30 of the photosensitive sheet of material 11. Surface 30 is shown as being in direct surface-to-surface engagement with the outer surface 18 of liquid crystal display cell 10. The cylindrical plane of the liquid crystal display image is shown by a cylindrical series of image segments 31, which schematically represents the individual pixels of the display. Lines 32 represent the maximum boundaries of radiation impinging across one edge of a pixel. The resulting dispersion of the liquid crystal display image about the surface 30 is represented by the space separating lines 33.

In addition to the radial dispersion illustrated in FIG. 5, one must also address the axial dispersion of radiation or light that will occur about the surface 30. This is schematically illustrated in FIG. 6, which shows a plurality of parallel circular columnating disks 14 arranged coaxially about the tubular radiation source 12. The lines 34 depict the outer boundaries of the direct rays that are permitted to project across one edge of an image segment 31 because of the blocking interference presented by the interposed disks 14. The resulting dispersion of the radiation at surface 30 is shown by the separation between the two lines 35.

FIG. 7 schematically shows a cross-sectional view of a portion of the preferred embodiment of the present invention with much of the detail removed for clarity. Identified in the figure are an end view of the linear radiation source 12, the image plane 31 of the liquid crystal display cell and the surface 30 of the recording medium.

As seen in FIG. 7, a point generated in the image plane 31 of the liquid crystal display cell will be projected through the transmissive liquid crystal display cell onto the surface 30 of the recording medium and will be diffused by an amount proportional to the distance between the liquid crystal display cell's image plane 31 and the surface 30 of the recording medium, the distance between the radiation source 12 and the liquid crystal display cell's image plane 31, and the diameter "D" of the tubular radiation source 12. This effect is uniform and independent of position about the circumference of the cylinder due to the symmetry of the system.

If an area of finite size such as a "dot" in a dot matrix representation of an alphanumeric character or a "pixel" in a graphic symbol is generated on the liquid crystal display cell, this area will be projected onto the recording medium as well, with its edges diffused in the same manner and to the same degree as for a point. It is primarily this effect which accounts for loss of resolution or definition of the edges when the projected rays are not entirely parallel.

In FIG. 7, distance "S" indicates one half the distance over which a projection of point "P" onto the recording surface will be diffused due to the nonparallel nature of the projecting rays and the spacing "d" between the recording medium and the liquid crystal display cell image plane. From this figure it can be seen that the following relationships hold:

$$\frac{r_1}{r_2} = \text{TAN}\alpha \text{ and } S \approx d \, \text{TAN}\alpha$$

where:
  $r_1$ = radius of light source, $r_2$ = radius of liquid crystal display cell image plane, d = spacing between the recording medium surface 30 and liquid crystal display cell image plane 31, $\alpha = \frac{1}{2}$ the angle formed by projecting all direct rays from source 12 through point "P", and S approximates one half the image diffusion distance along the recording surface 30.

Since the diffusion of the projected image around the periphery of the cylinder is primarily a function of the degree to which the light rays are nonparallel, determined in turn by the diameter of the light source, the distance between the light source and the liquid crystal display cell, and the spacing between liquid crystal display cell image plane and the recording medium, the degree of diffusion can be controlled by simply controlling the dimensions of the system.

As will be seen, control of the "parallelness" of the projecting light rays along the cylindrical axis is somewhat more difficult, but first, a discussion of the term "resolution", and some quantification of parameters would be helpful in developing this description of the preferred embodiment.

A full $8\frac{1}{2}''\times 11''$ sheet of information, printed with a dot matrix printer might contain up to 50 rows of text, each row containing up to eighty characters comprised of dots in the popular "5×7" format. FIG. 8 depicts the letter "t", printed in such a format. Typical dimensions for the dots 35 and inter-dot spacing as shown in FIG. 8 are 0.010" and 0.005", respectively.

Good resolution of the dots 35 when printed on surface 30 would dictate that the edges of the dots be clearly defined, that the solid or dark portion of the printed character depicted by the dots be distinctly dark, and that the light background, or the space between the dots, be white. Assuming that it is not possible to precisely control the boundary between the dark and light areas of the character, a region of gray will exist at each transition. It is the relative size of the fully dark portion of the printed dot to the fully light portion of the printed background and the width of this transition area which limits the resolution of the printed image.

FIG. 9 is an enlarged fragmentary view of the printed dots. It depicts a situation in which a gray area 36 surrounding the dark portion 37 of a printed dot is allowed to form a border 0.002" wide around a black area 0.008" on a side. The visual effect, compared to a printed dot of infinite resolution would be a dot which had appeared to "bloom" and lose contrast.

Clearly, a printing system capable of delivering only this level of resolution would have difficulty in reproducing characters of one half the size, and consisting of proportionately smaller dots than those of the character shown in FIG. 8. For dot matrix generated characters of the size shown in FIG. 8, however, the indicated level of resolution would produce a readable image. For purposes of describing the preferred embodiment of the present invention then, the degree of resolution described above will be considered adequate. Selection of these parameters is arbitrary, however, and is not intended to indicate a limitation of the degree of resolution possible with the present invention.

Referring again to FIG. 7, if the radius $r_2$ of the cylinder is set at 1.75" (the radius of a cylinder of circumference 11"), the radius $r_1$ of the flash tube is set at 0.23", and the distance d between the liquid crystal display cell image plane and the surface of the recording medium is set at 0.0075", then the distance S along the circumference of the curved recording medium, which corresponds to one half of the width of the gray area of the dot shown in FIG. 9, equals 0.001" by the formula given above. The minimum resolution is therefore met with the geometry shown, and could be doubled by halving the diameter of the flash tube. It should be noted that the width of the gray area 36 of the dot in FIG. 9 corresponds to the projection of the edge of the image (corresponding to point "P" in FIG. 7) by all direct rays emitted across the full diameter D of the flash tube in FIG. 7.

From the above it is seen that the resolution in the radial dimension of the image projected upon the recording medium is purely a function of the dimensions of the projection mechanism.

In the linear or axial dimension, the resolution must be controlled by limiting the angle of the direct rays projecting the image of the liquid crystal display cell onto the recording medium. The method used in the preferred embodiment is shown in FIG. 11, where columnating disks 14 are used to restrict the angle $\beta$ of direct rays to within 7.59 degrees of normal incidence. This is the angle corresponding to one half of the maximum angle subtended by direct rays as calculated for the radial dimension above, and guarantees that the resolution of the projected image in the linear direction, that is, along the axis of the cylinder, will equal the resolution of the projected image in the radial, or circumferential, direction, as shown in FIG. 7.

As seen from FIG. 11, the angle $\beta$ is determined by the depth of the columnating disks 14 and the disk spacing. From the figure, it is apparent that all three angles $\beta$ are identical, being referenced to the normal 38 to the central axis 39. If the depth of the disks (a in FIG. 11) and the disk spacing (b in FIG. 11) are set at 1.0" and 0.133", respectively, it can be seen that the axial dispersion distance S can be calculated as follows:

$$\beta = \text{ARC TAN} \frac{0.133''}{1.0''} = 7.58°$$

$$S = d\,\text{TAN}\beta = 0.0075'' \times 0.133'' = 0.001''$$

where:
↑ =maximum deviation from normal by direct rays;
d=distance between image plane and recording surface; and
S=½ linear dispersion distance in axial dimension. As calculated above, the dispersion distance "S" is the same as the corresponding distance calculated above for the radial case, or 0.001". This linear dimension corresponds to one half of the width of the gray area for the projected dot shown in FIG. 9 along one dimension. This distance could be reduced, increasing resolution, by increasing the depth of the columnating disks 14, decreasing their spacing, or both.

In FIG. 11, the columnating disks 14 are black and do not transmit or reflect light. These disks are spaced along the length of the flash tube by transparent plastic spacers 50. The method of segmenting the radiation is arbitrary, and could equally be accomplished by stacking transparent plastic washers of diameter approximately 2.5" along the length of the flash tube. The flat surfaces of the washers could be painted black to provide the necessary segmenting. The significant aspect of the invention is that the angle of light impinging upon the point P in FIG. 11 is restricted in the axial dimension to a narrow angle.

Finally, FIG. 10 shows the composite effect of having restricted the angle of direct rays from the light source in both the radial and axial dimensions, where the linear extent of the "dispersion area" 51 of the projection of point P in the display plane 31 onto surface 30 of the recording medium corresponds to the width of the gray area 36 of the dot depicted in FIG. 9 in each respective dimention.

To complete this description of the preferred embodiment, and referring to FIG. 2, if the length of the cylinder presented at the outer surface 18 of the liquid crystal display cell 10 is at least 8½", then a sheet 11 of 8½"×11" photosensitive paper can be wrapped around the 11" circumference of the cylinder and exposed through the transmissive liquid crystal display cell with high enough resolution to produce readable copy on sheet 11 as described above.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A recording device for generating and reproducing a presentation of visual information, comprising:
   a selectively operable radiation-transmissive liquid crystal display cell in the form of a partial or full cylinder having inner and outer coaxial surfaces centered along an axis spaced inwardly from the display;
   a radiation sensitive recording sheet having an inner surface wrapped about the outer surface of the liquid crystal display cell;
   radiation means located inwardly of the liquid crystal display cell and coaxially centered along the axis for directing radiation through the liquid crystal display to the inner surface of recording sheet; and
   axial columnating means interposed between the radiation means and the liquid crystal display cell for limiting dispersion of radiation directed onto the sheet in a dimension parallel to the axis.

2. The recording device of claim 1 further comprising:
   retaining means for holding the recording sheet in direct stationary engagement with the outer surface of the liquid crystal display cell.

3. The recording device of claim 1 wherein the radiation means comprises:
   a tubular source of radiation positioned at a stationary position coaxially along the axis;
   and control means operably connected to the radiation means and to the liquid crystal display cell for selectively causing them to be operable to expose the recording sheet.

4. The recording device of claim 1 wherein the liquid crystal display cell further comprises:
   support means for maintaining the liquid crystal display cell in a cylindrical plane centered along the axis.

5. The recording device of claim 1 wherein the liquid crystal display cell comprises a matrix of dots or pixels that can be activated to present an array of data to be transferred onto the recording sheet.

6. The recording device of claim 1 wherein the radiation means comprises a tube having cylindrical radiating surface coextensive in length to that of the liquid crystal display cell.

7. The recording device of claim 1 wherein the radiation means comprises a tube having cylindrical radiating surface coextensive in length to that of the liquid crystal display cell; and
   radial means interposed between the tube and the liquid crystal display cell for limiting the axial angle of radiation directed to the recording sheet.

8. The recording device of claim 1 wherein the radiation means comprises a tube having cylindrical radiating surface coextensive in length to that of the liquid crystal display cell;
   a plurality of radial circular disks arranged coaxially about the tube in axially spaced locations to limit the axial angle of radiation directed to the recording sheet.

9. The recording device of claim 1, further comprising:
   control means operably connected to the radiation means for selectively causing the radiation means to be operable for a time sufficient to expose the recording sheet through the liquid crystal display cell.

10. The recording device of claim 1, further comprising:
    control means operably connected to the liquid crystal display cell for selectively modulating the liquid crystal display cell to expose the recording sheet to radiation directed to it from the radiation means.

11. A printer comprising:
    a selectively operable radiation-transmissive liquid crystal display cell in the form of a partial or full cylinder having inner and outer coaxial surfaces centered along an axis spaced inwardly from the display;
    a radiation sensitive recording sheet having an inner surface wrapped about the outer surface of the liquid crystal display cell; and
    radiation means located inwardly of the liquid crystal display cell and coaxially centered along the axis for selectively directing radiation through the liquid crystal display to the inner surface of recording sheet;
    axial columnating means interposed between the radiation means and the liquid crystal display cell for limiting dispersion of radiation directed onto the sheet in a dimension parallel to the axis; and
    controller means operably connected to the liquid crystal display cell and to the radiation means for selectively maintaining a static presentation of data on the liquid crystal display cell as the radiation means is actuated.

12. The printer of claim 11 further comprising:
    input means for directing information pertaining to a desired presentation of data to the controller means.

13. The printer of claim 11 further comprising:
    portable electrical power supply means operably connected to the controller means and to the radiation means.

* * * * *